United States Patent [19]
Kwolek

[11] 3,714,319
[45] Jan. 30, 1973

[54] PROCESS FOR MAKING SEMI-METALLIC ARCUATE BRAKE LINING SEGMENTS

[75] Inventor: John P. Kwolek, Latham, N.Y.
[73] Assignee: The Bendix Corporation
[22] Filed: March 10, 1971
[21] Appl. No.: 122,845

[52] U.S. Cl. ................264/236, 264/119, 264/294, 264/325
[51] Int. Cl. ...............................B29b 1/14
[58] Field of Search......264/325, 294, 111, 119, 236; 106/36

[56] References Cited

UNITED STATES PATENTS

| | | |
|---|---|---|
| 2,943,357 | 7/1960 | MacMaster....................264/DIG. 65 |
| 3,402,054 | 9/1968 | Wood.......................................106/36 |
| 2,747,231 | 5/1956 | Reinhardt..........................264/111 X |

FOREIGN PATENTS OR APPLICATIONS 713,350  8/1954  Great Britain.........................264/119

*Primary Examiner*—Robert F. White
*Assistant Examiner*—Richard R. Kucia
*Attorney*—Raymond J. Eifler and Plante, Hartz, Smith & Thompson

[57] ABSTRACT

A process for making semi-metallic arcuate brake lining segments from graphite, metal powder, fibrous materials (asbestos and steel wool) and a phenolformaldehyde resin binder, by placing the materials in a specially designed pan and then heating the materials to a temperature between the cure and flow temperature of the resin before die pressing and curing the material to a predetermined arcuate configuration.

1 Claim, 4 Drawing Figures

PATENTED JAN 30 1973

3,714,319

JOHN P. KWOLEK
INVENTOR.

BY *S. J. Eifler*

ATTORNEY

PROCESS FOR MAKING SEMI-METALLIC ARCUATE BRAKE LINING SEGMENTS

BACKGROUND OF THE INVENTION

This invention relates to friction materials and more specifically to a method of producing semi-metallic friction material segments for brakes, clutches and the like.

To meet the demands of auto manufactures for a brake which would display high fade resistance, good recovery, wearability and increased effectiveness at both low and high temperatures, semi-metallic friction materials have been developed. Semi-metallics are capable of operating over the temperature range of 500° to 1,000°F, if effect bridging the gap between conventional organic materials and sintered metallics. The formulations of one such semi-metallic may be found in U.S. Pat. No. 3,434,998 to F. W. Aldrich et al. Characteristically, semi-metallics have high thermal conductivities, very low compressibilities and they polish but do not wear or groove opposing surfaces. The constituents of a semi-metallic are similar to those of a sintered material in that a semimetallic has a high iron and graphite content. However, unlike sintered materials, the iron (or other material) and graphite are mixed with an organic binder and cured. Presently, semi-metallic arcuate segments are prepared by compression molding techniques which require considerable grinding of the finished brake lining segment to arrive at the desired dimensions.

Further, compression molding processes for making arcuate segments produce a considerable number of rejects because of nonuniform density of the segment. Nonuniform densities cause patent defects, such as cracks in the segment, that render the segment unfit for use as a brake lining. Also latent density defects which are not readily apparent by visual examination reduce the performance of the segments when in use.

SUMMARY OF THE INVENTION

To overcome the aforementioned problems and to obtain an arcuate brake lining segment having a uniform density, a segment is made by a process wherein, before pressing and curing the brake lining to shape, it is preshaped by volumetrically filling a pan with the brake lining ingredients and heating the mixture until it coalesces.

The invention is characterized by a method of making arcuate brake lining segments which includes volumetrically filling pans with the brake lining ingredients to predetermined levels before compressing the mixture at 5,000 to 30,000 psi into the preferred shape. In a preferred method, a process for the preparation of a semi-metallic friction material comprises the steps of: mixing ingredients which include graphite, metal and an organic binder to uniformly disperse the ingredients; filling a pan with the mixture to a level that is deeper towards two ends of the pan that the middle of the pan; heating the filled pan until the temperature of the mixture is greater than the flow temperature of the organic binder but less than the cure temperature of the organic binder; pressing the heated material with a die to obtain an arcuate segment; and heating the arcuate segment to a temperature greater than the curing temperature of the organic binder to obtain a hard and rigid arcuate segment suitable for braking applications. The volumetric filling of the pan in step 2 of the method is characterized by the fact that the ratio of $D_1/D_2$ is approximately equal to the ratio of $T_1/T_2$ where $D_1$ is the depth of the mixture in the center of the pan and $D_2$ is the depth of the mixture at a predetermined distance from the center of the pan and where $T_1$ is the thickness of the pressed arcuate segment of step 4 at the centers thereof and $T_2$ is the thickness of the pressed arcuate segment at a predetermined distance from the center of the arcuate segment, which is the same as the predetermined distance that $D_2$ is from $D_1$. Utilizing the principles of the method herein described, it is now possible to manufacture arcuate segments having chordal lengths twice that of those which could normally be made by dies using conventional powder metallurgical presses. Further, the percentages of soft spots found in arcuate brake lining segments manufactured by this technique are significantly lower than those found in segments manufactured by conventional powder metallurgical pressing. Also, the green strength of the pressed arcuate segments manufactured by this technique is significantly higher than those manufactured by conventional powder metallurgical pressing. This facilitates handling and minimizes losses during manufacturing when the arcuate segments are transferred from the die press to the curing ovens.

Accordingly, it is an object of this invention to provide a process for making semi-metallic arcuate brake lining segments.

It is another object of this invention to produce arcuate brake segments having uniform density.

It is still another object of this invention to improve the performance of semi-metallic arcuate brake lining segments.

It is still another object of this invention to provide a process for making arcuate brake lining segments on high-speed single motion mechanical presses.

The above and other objects and features of the invention will become apparent from the following detailed description taken in conjunction with the accompanying claims which form a part of this specification.

DETAILED DESCRIPTION OF THE DRAWINGS

Figure 1:
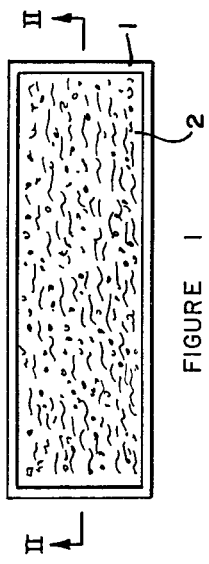
FIG. 1 is a plan view of a pan containing the ingredients of a friction material.

Referring now to the drawings, FIG. 1 shows a plan view of a pan filled with the ingredients necessary to make a friction material.

Figure 2:
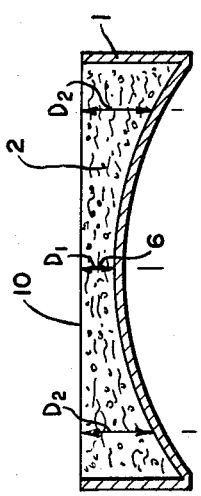
FIG. 2 is a cross-sectional view of FIG. 1 which illustrates how the specially designed pan is filled with the friction material.

FIG. 2 is a cross-section view of FIG. 1 which illustrates the configuration of the pan shown in FIG. 1 and the way that the friction material ingredients are placed in the pan. The friction material ingredients 2 are placed in the pan 1 so that the depth 6 at the midpoint of the pan is less than the depth of the mixture as it approaches the ends of the pan. The depth of ingredients at two points $D_2$ equidistant from the center $D_1$ is shown on the drawing. The depth of the ingredients of the two points $D_2$ is greater than the depth at the center $D_1$ and the same depth as each other. The depth of the friction material ingredients in the pan increases in a direction towards the ends of the pan 1.

Figure 3:
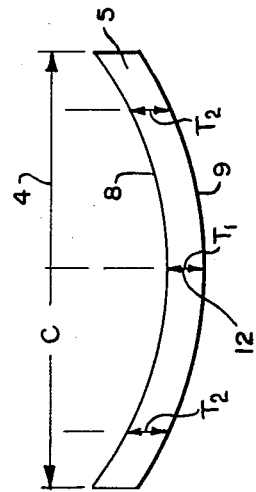
FIG. 3 is a side view of an arcuate brake lining segment.

FIG. 3 illustrates an end view of a friction material brake lining segment. The chordal length C is the straight line distance between the two ends of the arcuate segment 5. Because the segment is arcuately shaped, the radial thickness of the segment is always the same. However, the vertical thickness varies over the length of the segment. This is made readily apparent by drawing lines perpendicular to the chord 4 that extend through the arcuate segment 5 and consider only that portion of the line that passes between the surfaces 8 and 9 of the arcuate segment 5. The minimum thickness $T_1$ of the arcuate segment will be at the exact center 12 of the segment 5. In a direction away from the center of arcuate segment 5 the thickness of the segment increases as shown by comparing thickness $T_2$ to $T_1$. Because the thickness of the arcuate segment increases toward the ends of the segment, obtaining a uniform density segment by compression techniques is difficult. However, if this is recognized at the onset and steps are taken previous to the pressing to compensate for this difference, the problem of nonuniform densities can be avoided.

Figure 4:
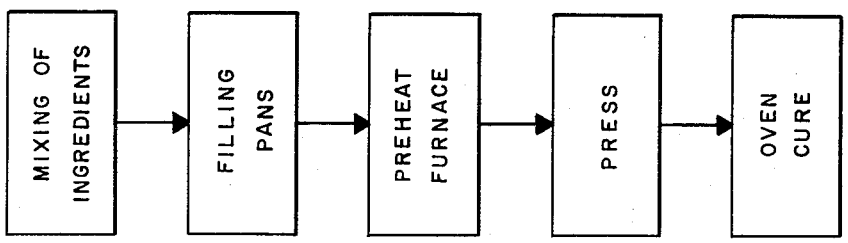
FIG. 4 is a process flow diagram which outlines the steps of a process for making semi-metallic arcuate brake lining segments.

FIG. 4 illustrates a process flow chart that includes the necessary steps of this process to achieve the objects of the invention.

The first step is to mix the dry ingredients which include ingredients such as graphite, metal, powder, fibrous material such as asbestos and steel wool, rubber, and a phenol-formaldeyhyde resin binder to obtain a substantially uniform mixture. An acceptable method of mixing would be to tumble intensively the ingredients until a uniform blend is obtained.

The next step is to fill the specially designed pans in the manner shown in FIG. 2. This step will compensate for the fact that the finished pressed arcuate segment will have different thicknesses. It is preferred that the depth D of the ingredients in the pan be between 2 to 4 times greater than the final thickness T of the pressed arcuate segment when measured along the same reference line 10.

When the pans are filled to the proper levels they are then placed in a furnace for preheating. The temperature of the furnace is set so that the temperature of the ingredients raises to a value between the cure and the flow temperature of the organic binder. For example, when a phenol-formaldehyde resin is used, the ingredients are heated to a temperature between 250° and 300° F. Once the ingredients reach this temperature they coalesce to form a single mass. This step helps to minimize the fracture of the preformed ingredients as they are transferred to the press and to improve the flow of the ingredients when pressed.

The hot mix preform is then transferred, generally by mechanical means, to a press where it is pressed by standard metallurgical dies to the final arcuate shape desired. Preferably the dies are cooled before the final arcuate shape is removed. This helps to limit heat build-up associated with thermal conduction from the hot mix to the dies. The cooling of the dies also facilitates high-speed production of the arcuate segments. Once the preheated mixture is placed in the press it is pressed in a die at a pressure between 5,000 and 30,000 psi.

The densified pieces are then removed from the press and placed in an oven to thermo-set (cure) the organic binder. Where a phenol-formaldehyde resin is used the oven temperature is set above 350° F.

While a preferred embodiment of this invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

Having described the invention, what is claimed is:

1. A process for the preparation of a semi-metallic friction material which comprises the steps of:

mixing ingredients which include graphite, metal powder, fibrous materials and phenol-formaldehyde resin in a tumbler to uniformly disperse said ingredients to produce a blended mixture;

filling a pan with said blended mixture to a reference level, said pan having a depth from a level reference line at the middle portion of the pan equal to $D_1$ and a uniformly increasing depth at the ends equal to $D_2$, said uniformly increasing depth forming an arcuate surface on the bottom of said pan;

heating the filled pan in a furnace to a temperature between 250°F to 300°F. to coalesce said mixture into a solid mass;

transferring said solid mass at a temperature between 250°F to 300°F to a press having an arcuate die which substantially matches the arcuate surface of said pan;

reducing the thickness of said solid mass from $T_1$ to $T_2$ by applying a pressure from 5,000 to 30,000 psi on said die to uniformly densify said solid mass into an arcuate segment, said $T_1$ thickness being between two to four times greater than the thickness $T_2$ of the densified arcuate segment when measured at the same point;

cooling said densified arcuate segment in said press while maintaining said pressure on said die to eliminate thermal build-up between said solid mass and said die and to assure said arcuate segment upon cooling will retain the shape of said die;

removing said cooled arcuate segments from said press;

transferring said cooled arcuate segments to an oven; and raising said temperature in said oven to above 350°F to cure the phenol-formaldehyde in said arcuate segment to obtain a hard and rigid arcuate segment suitable for a brake lining.

* * * * *